H. L. MERRICK.
INTEGRATING DEVICE.
APPLICATION FILED JAN. 16, 1907.
954,869.
Patented Apr. 12, 1910.
2 SHEETS—SHEET 2.
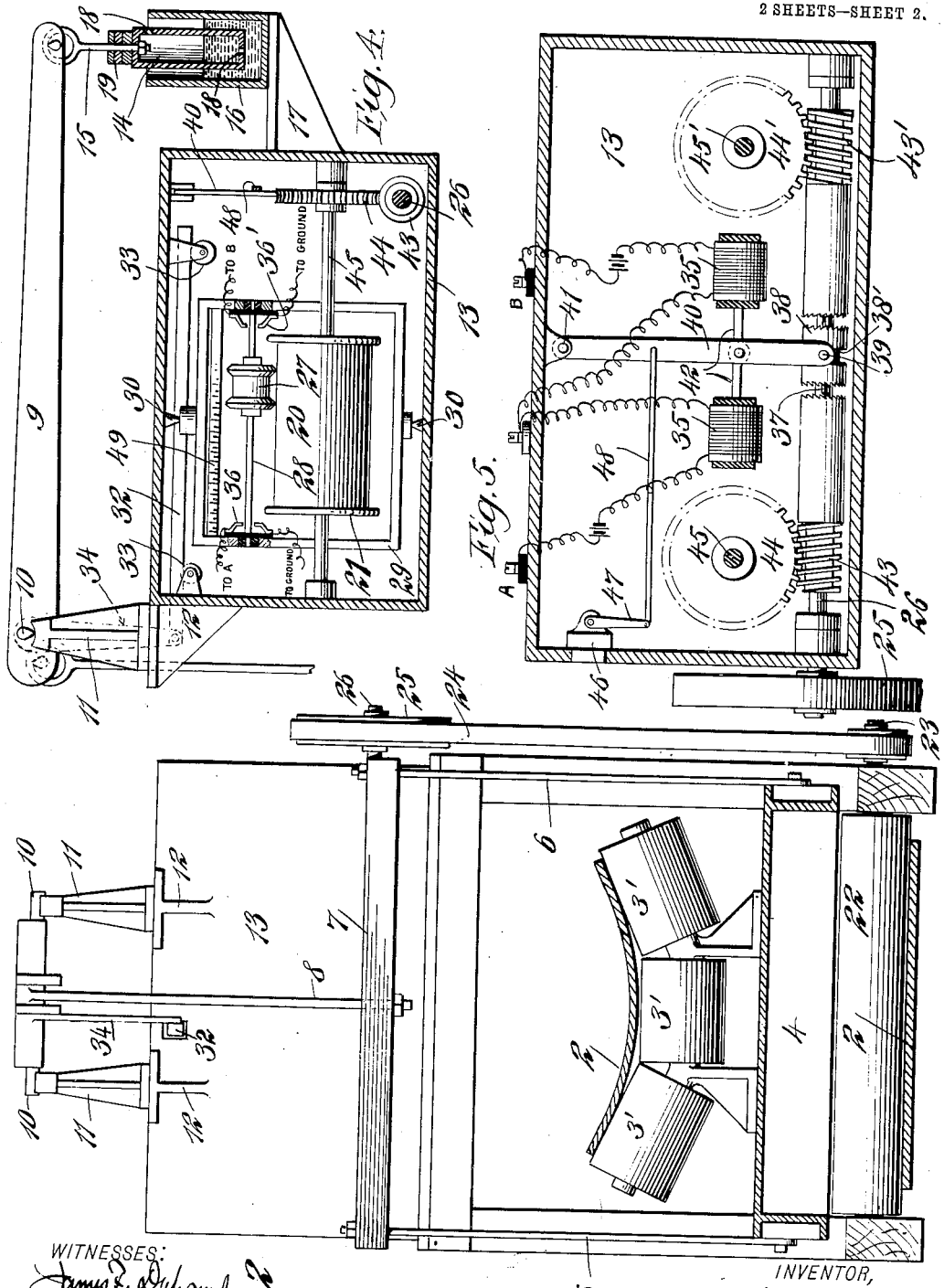
WITNESSES:
James L. Duhamel
7 Levy
INVENTOR,
Herbert L. Merrick,
BY Pierson L. Wells,
HIS ATTORNEY.

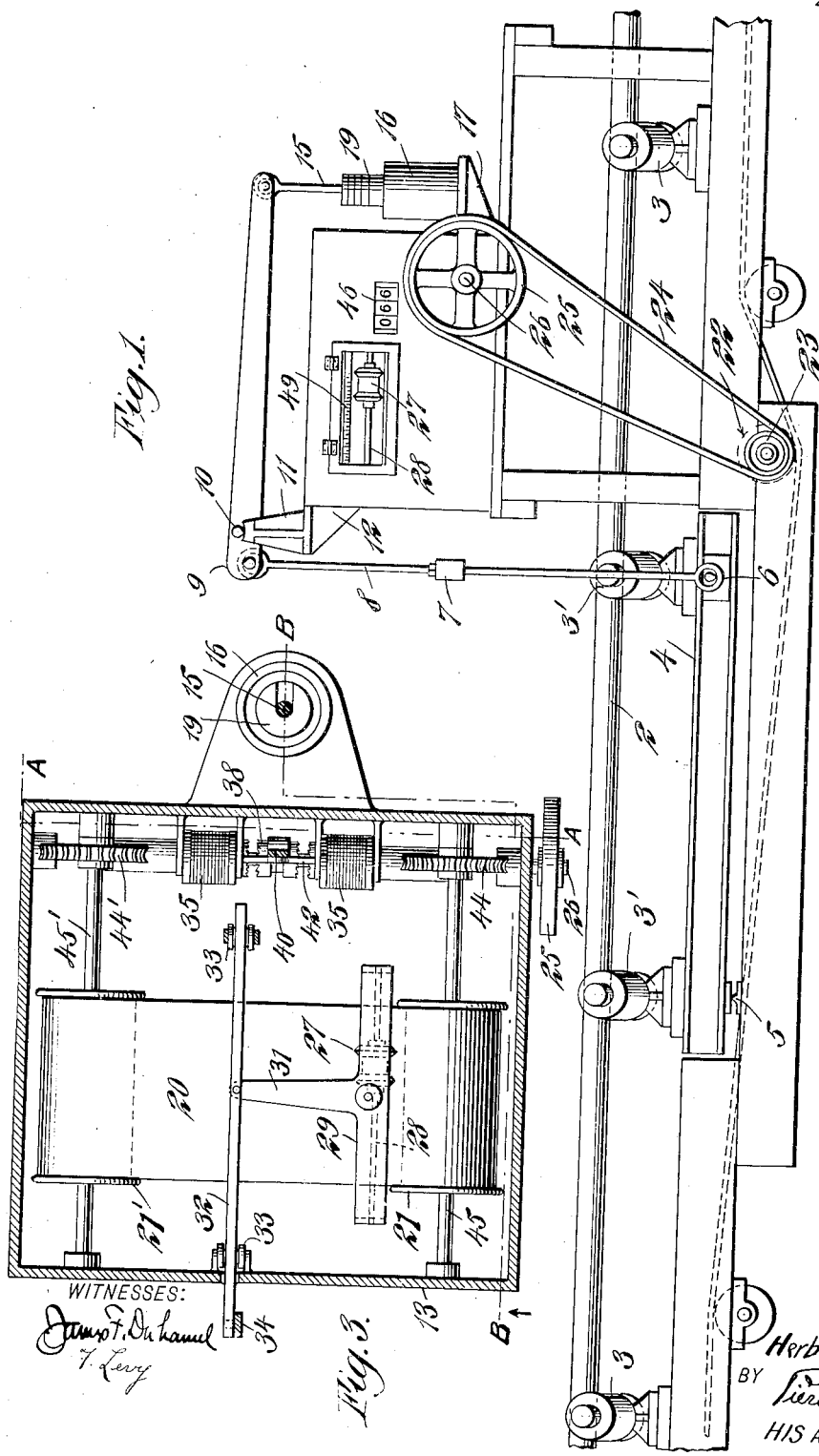

UNITED STATES PATENT OFFICE.

HERBERT L. MERRICK, OF PASSAIC, NEW JERSEY.

INTEGRATING DEVICE.

954,869.   Specification of Letters Patent.   Patented Apr. 12, 1910.

Application filed January 16, 1907. Serial No. 352,491.

*To all whom it may concern:*

Be it known that I, HERBERT L. MERRICK, of Passaic, New Jersey, have invented a certain new and useful Improvement in Integrating Devices, of which the following is a specification.

The device constituting the subject-matter of the present invention is designed to automatically integrate, or sum up, a series of quantities whose values or magnitudes are functions of two other quantities either one or both of which may be variable. The series of quantities whose integration is thus effected may be, consecutively, so close together as to differ practically infinitesimally from each other, the quantity being integrated depending for its value at any given instant upon the contemporaneous values of the aforesaid variable quantities.

The present mechanical integrator embodies, essentially, two elements, to wit, a traveling element or surface and a frictionally driven planimeter or integrating wheel one at least of which elements is shiftable from a zero position in which the plane of rotation of the wheel is in line with the direction of travel of the surface to thereby effect a variable angular relation of such plane and direction of travel. The rate of travel of said surface is representative of one of said variable quantities while the angle made by the line of travel of such surface with the plane of rotation of the wheel is representative of the other variable quantity. This variable angular relation produces a variable axial thrust on the wheel, that is, a thrust which is adapted to move the wheel laterally of the surface with which it is in contact, and at the same time influences the rotative speed of the wheel. In order to preserve the rotative continuity of the integrating wheel movement when the wheel has reached either extreme of its axial movement, its arrival thereat is utilized to control the actuation of a reversing device by means of which a relation is established such that the lateral movement of the wheel is reversed. These reversals, if registered by a counter, serve to indicate the result of the integration, while the position of the integrating wheel between its extremes of lateral travel (as observed on a suitable scale) gives the amount integrated between the time of the last reversal and that at which the observation is made.

In the drawing accompanying the present specification, the invention is illustrated as applied to the weighing of material on a conveying belt and in this drawing Figure 1 is a side elevation of a portion of a conveying belt with which is combined a weigher embodying the features of the present invention. Fig. 2 is an end elevation looking from the left of Fig. 1. Fig. 3 is a plan view with top of casing cut away to show the recording apparatus therein. Fig. 4 is a sectional elevation on line B—B, Fig. 3, looking in the direction of the arrow in Fig. 3 and shows the recording apparatus of the weigher on an enlarged scale. Fig. 5 is a sectional elevation through line A—A, Fig. 4, looking from the right.

Similar characters of reference designate corresponding parts in all figures.

The present mechanical integrator is hereinafter described as elements of an apparatus for weighing material, since I find this at the present time one of its most valuable applications. I do not wish, however, to confine myself to such particular application, as the integrator may be used generally under circumstances in which conditions such as hereinbefore adverted to obtain.

For convenience of illustration and description of the features of the invention a conveying belt 2 is indicated whose upper or carrying stretch is supported on trough-forming rolls 3 in a well known manner. At a convenient point past which the belt travels (herein designated as the weighing point) the load on the belt is here caused to influence a steel-yard, weighing beam or weighing scale. The construction herein adopted comprises a platform 4 fulcrumed at one end, see 5, and whose opposite end is hung from a pair of links 6, 6, joined by a cross bar 7 which connects by means of a suspension bar 8 with one end of a steel-yard or beam 9. Points of suspension may of course be knife edges when desired.

Mounted on platform 4 are shown two sets 3', 3' of troughing idlers or rolls, while beam 9 is here fulcrumed, see knife edges 10, upon standards 11, secured to brackets 12 rigid with the weigher casing 13. It is evident from this construction that the turning of weighing beam 9 about its fulcrum is under the direct control of the loaded conveyer passing over the weighing platform and in order to offset the weight of the load on the conveyer some suitable form of resistance is connected to steelyard 9. The one illustrated comprises a mercury float and dash pot or damper combined and consists of a hollow cylinder 14 suspended by a link 15 from the end of beam 9 and dipping into a mass of mercury in an open vessel 16 on a bracket 17 of casing 13. This float so acts as to permit a constantly increasing movement of the beam from its normal or no load position for constantly increasing loads on the suspended portion of the conveyer. To prevent too rapid vibration of the beam, the bottom of float 14 is closed and small openings 18 throttle the passage of the mercury and air to the inside tending only to retard the action without affecting the accurate movement of the float. Adjustable weights 19 balance the static load so that the system assumes its normal or zero position when there is no load passing over the weighing point.

Essential parts of the present integrator consist of a traveling element or surface whose rate of motion in this instance is a function of the rate of motion of the conveyer and therefore representative of one of the quantities to be integrated and a planimeter or integrating wheel (hereinafter designated integrating wheel) adapted to roll or rotate in contact with such surface. While any particular absolute ratio of travel of the conveyer and said surface is not essential, it is of course important that any change or fluctuation in the speed of the conveyer should be accompanied by a corresponding change in the speed of said surface, that is to say, the two should move in synchronism. In this instance the traveling element consists of an endless belt 20 running over rolls 21, 21', and (to fulfil the aforesaid requirements) driven from the conveyer belt, the lower stretch of the belt driving a roll 22, rigid with which is a pulley 23 over which runs a driving belt 24 embracing a pulley 25 affixed to a shaft 26 mounted in bearings supported by the weigher casing.

The periphery of the integrating wheel 27 bears against the surface of belt 20 and is so mounted that its plane of rotation, relatively to the line of travel of belt 20, and hence its angular velocity and coincident inverse tendency to move axially, laterally toward the edge of the belt, is under the direct control of the beam. That is to say, as here designed, shaft 28 of said wheel is disposed in a frame 29 which incloses belt 20, above, below and at the sides. This frame is pivoted to turn about an axis normal to belt 20 defined by the pivot pins 30 and is provided with a laterally extending arm 31 with which a slide bar 32 engages. This slide bar, preferably, moves on anti-friction rollers 33 and is pivoted to the end of an arm 34 extending from beam 9. It is evident, moreover, that since the tendency of moving belt 20 to turn wheel 27 (and hence the rotative speed of the wheel) varies with the angular relation of the plane of rotation of the wheel to the line of movement of the belt variations of the load passing the weighing point will tend to cause a variation in the rotative and axial movement of the wheel the rotative speed in the present device decreasing with increase of load. It is evident, furthermore, that while the tendency of wheel 27 to move laterally of the belt is substantially constant for a constant load passing the weighing point, this tendency, for reasons aforesaid, varies with variations of load, increasing with increase of load.

To render the axial motion automatically continuous, means are provided for so alternating the relation of the coöperative parts that the integrating wheel having reached a point adjacent to one edge of the belt, is caused to travel toward the opposite edge thereof and so on alternately. That is to say, in the present instance, wheel 27 is rotatably and slidably mounted on the fixed shaft 28 and is caused at each extremity of its axial movement to control the operation of an extraneous force or motor which in turn causes a reversal of movement of belt 20. Preferably, in order to throw as little work upon wheel 27 as possible during these reversing operations (a minimum of retardant force minimizing the error of the weighing record) I may, as shown, use an electrically operated motor element in the nature of a solenoid 35, one for effecting the reverse when wheel 27 has reached the reversing point adjacent to one edge of the belt and the other for a similar purpose at the opposite edge. Switches 36 and 36' adjacent to the ends of shaft 28 are each adapted to have it electric continuity completed when wheel 27 comes in contact with it. One finger of each switch may be grounded to the weigher casing and, similarly as to one end of the wire of each solenoid, while the remaining ends of the solenoid wires are connected to the corresponding insulated switch fingers.

Slidably mounted on a feather or key 37 of shaft 26 is a clutch member 38 in a circumferential-groove 38' of which extends one or more pins 39 which project from the free end of a lever 40 pivoted at 41 to the weigher casing and to which lever is also connected the core 42 of solenoids 35, 35. According as clutch member 38 is moved to its right or its left hand position in Fig. 5, (through the actuation of the corresponding solenoid) either one or the other of a pair of right and left hand worms 43, 43', is rigidly connected to shaft 26, and belt 20 driven in one direction or the other through worm wheels 44, 44' affixed to respective shafts 45, 45', of the belt supporting rolls 21, 21'.

If the apparatus is appropriately adjusted and calibrated, it is plain that a record of the number of reversals of belt 20 occurring within a given time may serve to indicate the total weight carried past the weighing point within that time. These reversals, and hence the weight conveyed or, in general, the result of the integration may be indicated by an instrument in the nature of a counter 46 whose actuating arm 47 is connected by a link 48 with lever 40. If it is desired moreover, that the amount of the integration between the times of two consecutive reversals should be ascertainable, a properly graduated scale 49 may be secured to frame 29 in such a position, that, in conjunction with wheel 27, such amount may be read off.

From the foregoing description, it is clear that the intermittent nature of the registering device actuation creates no constant retardant action which would impair the freedom of movement of the wheel (and hence the accuracy of the registration) as would be the case if the registering device were mechanically driven from the wheel. It is evident, also, that the action of the wheel in closing a circuit, as and for the purpose described, may be such as to throw no sensible work on the wheel while the friction incident to the axial movement of the wheel is a minimum since the former is at the same time in rotation. In the present improvements, therefore, the forces tending to create errors are either eliminated, minimized or balanced so as to produce no sensible error in the results indicated by the apparatus.

Having described my invention, I claim;

1. An integrating device comprising, in combination, a rotarially and axially movable integrating wheel, a driven element by which said wheel is frictionally actuated, mechanism for driving said element at a rate of travel which fluctuates in correspondence with fluctuations in the value of one of the quantities to be integrated, means for varying the angle between the line of travel of said element and the plane of rotation of said wheel in correspondence with fluctuations in the value of the other quantity, and means for measuring the axial movement of said wheel.

2. An integrating device comprising, in combination, an integrating wheel adapted to have a to and fro axial movement, a driven element by which said wheel is frictionally actuated and the line of travel of which in the zero position of the device coincides with the plane of rotation of said wheel, means for causing said plane and said line of travel to assume a variable angular relation whereby during integration a variable axial thrust on said wheel results, means for reversing the direction of axial movement of said wheel at each end of such movement, and a registering device for registering the axial excursions of said wheel.

3. An integrating device comprising, in combination, an axially movable integrating wheel, a driven wheel-actuating element the angle between the line of travel of which and the plane of rotation of said wheel is adapted to vary a reversing mechanism whose position determines the direction of motion of said driven wheel-actuating element, motors under the control of said wheel when it reaches the respective ends of its axial excursions for shifting the position of said reversing mechanism, and means for registering the axial excursions of said wheel.

4. An integrating device comprising, in combination, an axially movable integrating wheel, a driven wheel-actuating element the angle between the line of travel of which and the plane of rotation of said wheel is adapted to vary during integration, an electrically controlled reversing device for changing the direction of motion of said element when said wheel reaches each end of its axial excursions, and means for registering the axial excursions of said wheel.

5. An integrating device, comprising, in combination, a driven belt, a frame mounted to turn about an axis normal to the surface of said belt, an integrating wheel frictionally driven by said belt and mounted on said frame to turn about an axis substantially parallel to the surface of said belt and which wheel is shiftable lengthwise of said axis, a reversing device for changing the direction of motion of said belt when said wheel reaches the ends of its axial excursions, and means for measuring the axial movement of said wheel.

6. An integrating device comprising, in combination, a driven belt, a frame mounted to turn about an axis normal to the surface of said belt, an integrating wheel frictionally driven by said belt and mounted on said frame to turn about an axis substantially parallel to the surface of said belt and which wheel is shiftable lengthwise of said axis, an electrically controlled reversing device for changing the direction of motion of said belt when said wheel reaches the ends of its axial excursions, and means for measuring the axial movement of said wheel.

7. An integrating device comprising, in combination, a driven belt, a frame mounted to turn about an axis normal to the surface of said belt, an integrating wheel frictionally driven by said belt and mounted on said frame to turn about an axis substantially parallel to the surface of said belt and which wheel is shiftable lengthwise of said axis, clutch mechanism for driving said belt in opposite directions, clutch-controlling electric devices operative from said wheel at the ends of the axial excursions thereof whereby the direction of motion of said belt is reversed at the end of each axial excursion of said wheel, and means for measuring the axial movement of said wheel.

In testimony whereof I have signed my name to this specification in the presence of two subscribing witnesses.

HERBERT L. MERRICK.

Witnesses:
LINCOLN MOSS,
CLARENCE W. SINN.